United States Patent [19]

Fujiki et al.

[11] 4,104,632
[45] Aug. 1, 1978

[54] SYSTEM FOR PREVENTING COLLISION OF VEHICLES

[75] Inventors: Norio Fujiki, Yokohama; Hiroshi Endō, Yokosuka, both of Japan

[73] Assignee: Nissan Motor Company, Limited, Yokohama, Japan

[21] Appl. No.: 740,215

[22] Filed: Nov. 9, 1976

[30] Foreign Application Priority Data

Nov. 10, 1975 [JP] Japan .................... 50/134116

[51] Int. Cl.² .............................................. G01S 9/02
[52] U.S. Cl. ................................................ 343/7 VM
[58] Field of Search ................................... 343/7 VM

[56] References Cited
U.S. PATENT DOCUMENTS 3,921,749  11/1975  Kawada .................. 343/7 VM X
3,978,481  8/1976  Angwin et al. ............. 343/7 VM Primary Examiner—T.H. Tubbesing
Attorney, Agent, or Firm—Bacon & Thomas

[57] ABSTRACT

A system for preventing collision wherein a radar system is mounted on a vehicle for generating a relative speed signal and a relative distance signal. There are provided a brake signal generating logical circuit responsive to the relative speed signal and the relative distance signal for actuating a brake actuator, first and second comparators for comparing the relative speed signal and the relative distance signal respectively with reference signals, and an information processing signal responsive to the outputs from the first and second comparators for actuating the brake actuator. There is also provided a braking signal releasing circuit for disenabling the brake actuator after the vehicle has stopped.

7 Claims, 12 Drawing Figures

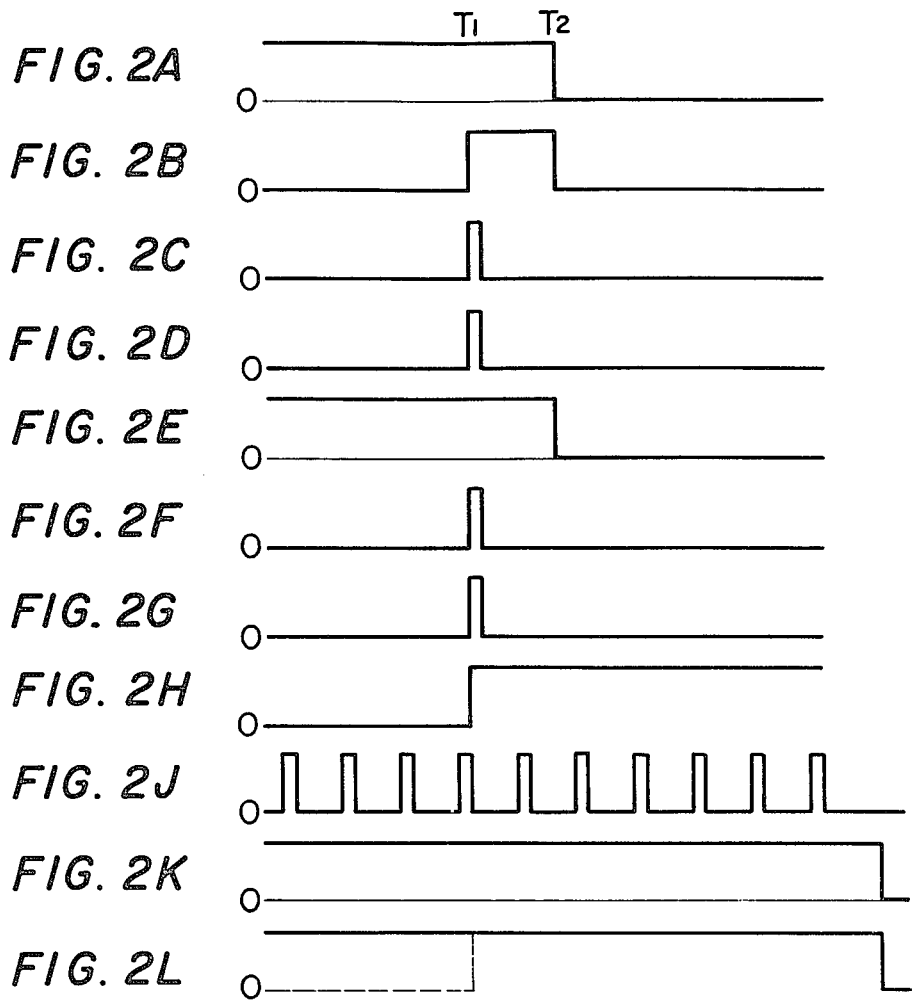

SYSTEM FOR PREVENTING COLLISION OF VEHICLES

BACKGROUND OF THE INVENTION

The present invention relates to a system for preventing collision of a vehicle.

For the purpose of preventing collision of a vehicle against an obstacle, it has been the practice to mount a radar system on a vehicle to detect the relative distance and relative speed between the vehicles or between a vehicle and an obstacle. As the radar system is mounted on the vehicle, a single antenna system capable of transmitting and receiving the waves is more preferable than a system utilizing a plurality of antennae in view of the mounting space of the antenna, and a pulse radar system has been generally used because of its high accuracy of measuring distance. In the single antenna type pulse radar system, for the purpose of preventing the saturation phenomena in the receiving amplifier caused by a signal leaked from the transmitting system to the receiving system, the receiving sensitivity is intentionally decreased during about 2 to 3 times of the pulse width starting from the instant of transmitting a pulse. Therefore, where the time required for the pulse to reach a target is shorter than this interval, the reflected signal will be completely eliminated thus establishing a so-called blind zone in which the radar system cannot detect the target.

In this manner, when a vehicle approaches an obstacle and comes into a blind zone, the prior art radar system misses the obstacle so that it cannot detect such target informations as the distance to the obstacle and the relative speed between the vehicle and the obstacle. Accordingly, a braking signal for commanding the braking operation of the vehicle is interrupted so that the brake will be inadvertently released whereby the vehicle collides against the obstacle at a speed with which the vehicle has entered into the blind zone.

SUMMARY OF THE INVENTION

Accordingly, it is an object of this invention to provide an improved system for preventing collision of a vehicle utilizing a single antenna type pulse radar system which can ensure the operation of the brake actuate to positively stop the vehicle even when the vehicle approaches close to an obstacle and enters into a blind zone of the radar system.

According to this invention, there is provided a system for preventing collision of a vehicle, comprising a radar system mounted on the vehicle for generating a relative speed signal representing the relative speed between the vehicle and an obstacle and a relative distance signal representing the relative distance between the vehicle and the obstacle, a brake signal generating logical circuit to be driven by the relative speed signal and the relative distance signal, a first comparator for comparing the relative speed signal with a first reference value, a second comparator for comparing the relative distance with a second reference value, an information processing circuit responsive to the output from either one of the logical circuit and the first and second comparators, for actuating a brake actuator of the vehicle, and a brake releasing circuit for disenabling the brake actuator after the vehicle has stopped.

BRIEF DESCRIPTION OF THE DRAWINGS

The detail of the construction and the operation of the system of this invention can be more fully understood from the following detailed description taken in conjunction with the accompanying drawings in which:

FIGS. 2A–2L show signal wave forms of the various elements of the system shown in FIG. 1; and

DESCRIPTION OF THE PREFERRED EMBODIMENT

Figure 1:
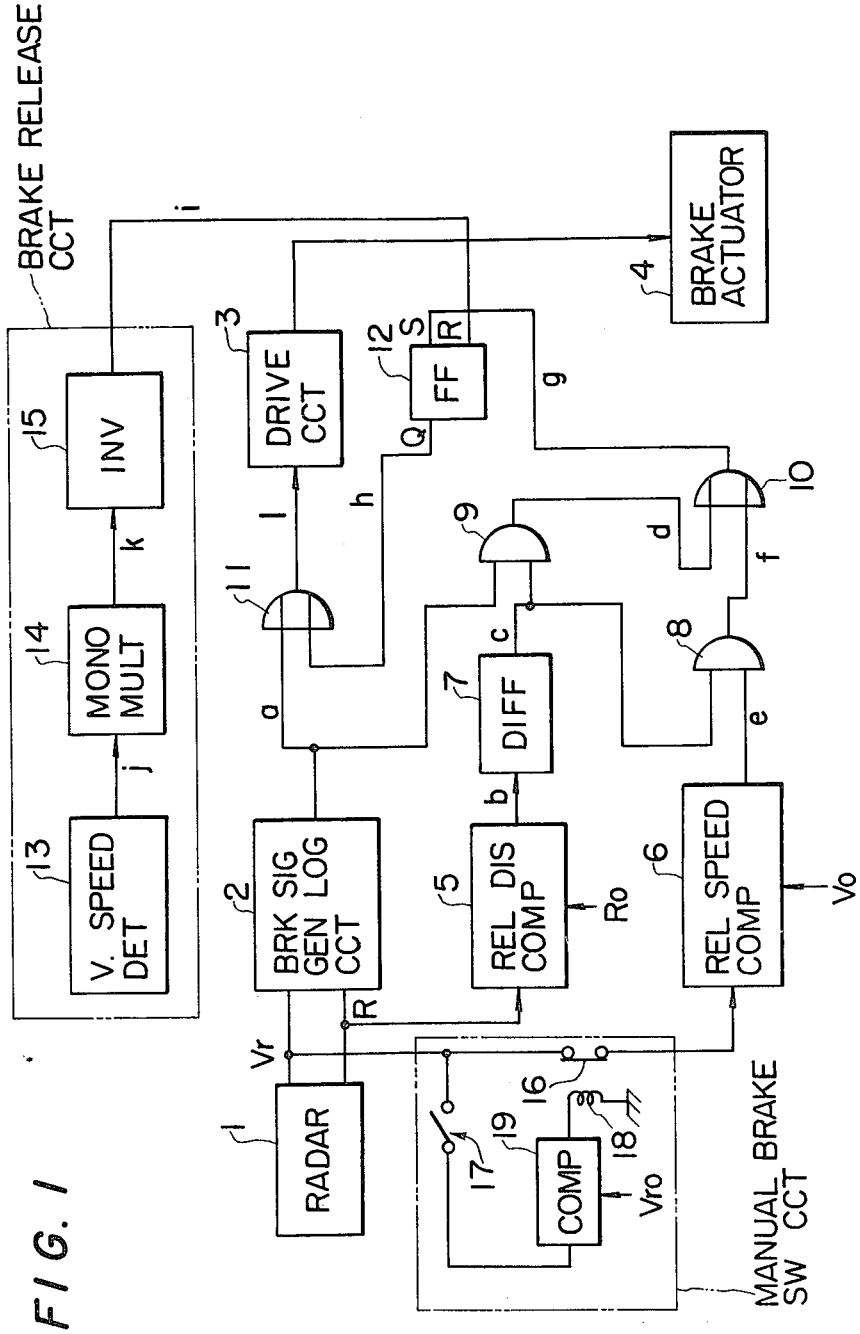
FIG. 1 is a block diagram showing one embodiment of the system for preventing collision of a vehicle according to this invention.

The preferred embodiment of this invention illustrated in FIG. 1 comprises a radar system 1 for transmitting a speed signal Vr and a distance signal R respectively corresponding to the relative speed between an obstacle and a vehicle and the distance therebetween. These signals are applied to a brake signal generating logical circuit 2, and where either one of these signals exceeds a permissible value predetermined by the running condition of the vehicle, the brake signal generating logical circuit 2 produces a brake signal $a$ commanding the braking of the vehicle. The brake signal $a$ is applied to one input of an OR gate 11 for producing a composite brake signal $l$ which is applied to a drive circuit 3 of a brake actuator 4 of the vehicle thus positively and safely stopping the same. Above description can be applied to a case wherein the braking operation is performed when the obstacle is located remote from the blind zone. At this time, since brake is applied at a point remote from the blind zone a relative distance comparator 5, which is designed to operate when the obstacle approaches the blind zone, will not operate so that an AND gate 9 will not be energized. When the vehicle speed relative to the obstacle exceeds a permissible value Vo, the relative speed comparator 6 is adapted to apply a logic "1" signal to AND gate circuit 8. In this instance, an OR gate 10 is not energized. Accordingly, flip-flop circuit 12 does not operate and OR gate circuit 11 correctly supplies a composite signal $l$ to the drive circuit 3.

However, as above described, when the obstacle enters into the blind zone which is inherent to a radar system, the radar does not operate and both speed signal Vr and distance signal R are not produced, as shown in FIG. 2a. Consequently the braking signal $a$ disappears at a time T2 when the obstacle enters into the blind zone. Accordingly, with the first system described above a dangerous condition may occur because the braking signal disappears thus making it impossible to safely stop the vehicle. Moreover, as the vehicle speed relative to the obstacle is low there is a danger that the vehicle continues to run and collides against the obstacle because the first system fails to produce the braking signal.

According to this invention, for the purpose of preventing this defect, an improved collision preventing device, is provided. When the relative speed to the obstacle is less than a reference value so that no braking signal $a$ is generated the comparator 5 of the relative distance shown in FIG. 1 supervises the distance between the obstacle and the vehicle, and when the distance becomes a value $Ro$ which is about 1 meter larger than the blind zone $R_B$, at time T1 the comparator 5 produces a signal $b$. This signal $b$ is differentiated by a differentiating circuit 7 to produce a differentiated pulse blind zone signal c which is applied to the other input of the AND gate 9 which produces an output second holding signal d. At this time, the relative speed comparator 6 does not produce output higher speed signal e so that the AND gate 8 is not enabled and does not produce a first holding signal f whereas OR gate 10 is enabled to produce an output signal g which is applied to the flip-flop circuit 12 for applying a brake holding signal h from the output terminal Q to the OR gate 11. Since the braking signal a disappears at time T2 when the obstacle enters into the blind zone, the OR gate 11 is enabled at this time for applying a composite braking signal l to the drive circuit 3 to operate the brake actuator 4. In this manner, the brake signal generating logical circuit 2, comparators 5 and 6, and differentiating circuit 7, AND gates 8 and 9, OR gates 10 and 11 and flip-flop circuit 12 which intercouples circuits 2, 5 and 6 constitute an information processing circuit for positively applying braking drive signal to the brake actuator 4 in various dangerous conditions.

For the purpose of releasing the brake, three is provided a brake release circuit comprising a vehicle speed detector 13, a monostable multivibrator 14 and an inverter 15. A vehicle speed pulse signal j from the vehicle speed detector 13 is applied to the monostable multivibrator 14 which can be triggered again. The quasi stable state persisting time of the monostable multivibrator 14 is about 10 seconds and the period of the vehicle speed pulse signal is made to be shorter than this time. As a consequence, the vehicle speed pulse signal j continues to maintain the monostable multivibrator 14 at the quasi stable state whereby its output k maintains a logical value "1" until the vehicle stops completely. When the vehicle stops and about 10 seconds later, which is equal to the monostable state persisting time of the monostable multivibrator 14, the output k changes to logical value "0". The output k from the monostable multivibrator 14 is inverted by the inverter 15 and a brake releasing signal i is then applied to the reset terminal of the flip-flop circuit 12. Accordingly, when the output k from the monostable multivibrator 14 changes to logical value "0", the flip-flop circuit 12 is reset to extinguish the brake holding signal to deenergize the brake actuator 4 thereby releasing the brake of the vehicle.

Further, there is provided a manual brake switching circuit comprising a comparator 19, a switch 17, a relay 18 and its relay switch 16 for the purpose of utilizing the collision preventing system when the speed of the vehicle relative to the obstacle is lower than a value at which the vehicle can be stopped by the braking operation caused by the manual operation by the driver. When the switch 17 is held closed by the driver, and as the vehicle speed decreases to a value at which the vehicle can be manually stopped by the driver, the comparator 19 which compares the vehicle speed with a reference speed $V_{ro}$ energizes relay 18 to open its relay switch 16. Then, the circuit through relay switch 16 is interrupted so that the driver can apply brake as he desires. The relay switch 16 may be inserted in other circuits of the information processing circuit.

As above described, with the system for preventing collision of a vehicles according to this invention where the relative speed between a vehicle and an obstacle is high, a composite signal l is produced when the obstacle approaches a point located more remote from the blind zone of a radar system, whereas when the relative speed between the vehicle and the obstacle is low the composite braking signal is generated immediately prior to the entering of the obstacle into the blind zone. Accordingly, in each case, as soon as the obstacle enters into the blind zone the composite braking signal is produced to stop the vehicle, thus positively preventing collision. In this manner, according to the system of this invention, even when a radar system having a blind zone such as a pulse radar system using a single system is used for preventing collision of a vehicle it is possible to eliminate the defect in the ability of the radar system for detecting an obstacle in the blind zone with the result that even when the obstacle enters into the blind zone. The braking of the vehicle can be performed positively until the vehicle stops completely. Thus the reliability and utility of the collision preventing system are improved greatly.

What is claimed is:

1. An anti-crash system for a vehicle comprising:
   a brake actuator of said vehicle;
   a radar system mounted on said vehicle for generating a relative speed signal representative of a relative speed between said vehicle and an obstacle in front of said vehicle and a relative distance signal representative of a relative distance between said vehicle and said obstacle;
   a brake signal-generating logic circuit connected to said radar system for producing a brake signal in response to said relative speed and relative distance signals;
   means for comparing said relative speed signal with a first predetermined reference value and for producing a higher speed signal when said relative speed signal exceeds said first reference value;
   means for comparing said relative distance signal with a second predetermined reference value and for producing a blind zone signal when said relative distance signal is lower than said second reference value;
   means connected for receiving said blind zone signal and said higher speed signal and for generating a first holding signal when receiving both said blind zone signal and said higher speed signal;
   means connected for receiving said braking signal and said blind zone signal and for generating a second holding signal when receiving both said braking signal and said blind zone signal;
   means for generating a brake holding signal in response to either one of said first and second holding signals; and
   means for driving said brake actuator in response to either one of said braking signal or said brake holding signal.

2. The apparatus of claim 1, further comprising means for generating a brake releasing signal for application to said means for generating said brake holding signal when said vehicle substantially stops.

3. The apparatus of claim 2, wherein said means for generating said first holding signal comprises AND gate means having the input terminals thereof connected to said means for generating said higher speed signal and said means for generating said blind zone signal.

4. The apparatus of claim 2, wherein said means for generating said second holding signal comprises AND gate means having the input terminals thereof connected to said means for generating said blind zone signal and said brake signal-generating logic circuit.

5. The apparatus of claim 2, wherein said means for generating said brake holding signal comprises:

first OR gate means having input terminals thereof connected to said means for generating said first and second holding signals; and flip-flop circuit means having the set terminal thereof connected to the output terminal of said first OR gate means and the reset terminal thereof connected to said means for generating said brake releasing signal.

6. The apparatus of claim 5, wherein said means for driving said brake actuator comprises:

a second OR gate having the input terminals thereof connected to the output of said brake signal generating logic circuit and an output terminal of said flip-flop circuit means; and drive circuit means having an input terminal thereof connected to said second OR gate means, for driving said brake actuator in response to said brake releasing signal from said second OR gate means.

7. The apparatus of claim 5, wherein said means for generating said brake releasing signal comprises:

a vehicle speed detector for producing a pulse train the period of which represents the vehicle speed;

a mono-stable multivibrator triggered by said pulse train for producing a logic signal as long as it is triggered by said pulse train; and an inverter connected to said mono-stable multivibrator, for producing an opposite logic signal to the input logic signal applied thereto from said mono-stable multivibrator so as to reset said flip-flop circuit means.

* * * * *